2,971,987

PROCESS FOR PRODUCING CRYSTALLINE TRIMETHYLOLPHENOL

Cal Y. Meyers, Princeton, N.J., assignor to Union Carbide Corporation, a corporation of New York No Drawing. Filed July 29, 1957, Ser. No. 674,627

13 Claims. (Cl. 260—621)

This invention relates to a process for producing 2,4,6-trimethyloylphenol. More particularly, this invention relates to a process for producing crystalline trimethylolphenol from an alkali or alkaline earth metal salt of trimethylolphenol under carefully controlled conditions.

As used herein, the term "trimethylolphenol" signifies the compound 2,4,6-trimethylolphenol, which compound may be represented by the graphic formula

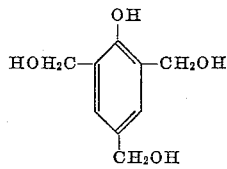

Trimethylolphenol is a useful water-soluble, resin-forming compound having a melting point of about 84–86° C., which is suitable for use in many applications, particularly as a component of phenolic resin forming compositions. It may be readily homopolymerized or reacted with polyhydroxy compounds which systems are generally water-soluble or at least water dispersible so as to be readily applied from aqueous solutions. After application, the resins can be cured with heat, or with acidic cure accelerators, or with both to a hard, infusible, water-insoluble thermoset resin.

One of the principal difficulties heretofore of obtaining trimethylolphenol in pure form has been its extreme ease of self-condensing and polymerization. Under even mildly acidic or alkaline conditions the trimethylolphenol will self-condense and otherwise be unusable. In addition, its great affinity for water has made recovery of the crystalline product extremely difficult. Heretofore preparation of the pure trimethylolphenol has been accomplished only through extended and expensive methods of preparation.

Carpenter and Hunter, J. Appl. Chem., 1, 217 (1951), report that they were able to secure trimethylolphenol by the reduction of acetoxytrimesic acid triethyl ester with lithium aluminum hydride. Martin, J. Am. Chem. Soc., 74, 3024 (1952), was able to secure a crystalline product believed to be nearly pure trimethylolphenol (melting point 84° C.) starting with phenol and formaldehyde. A mixture of polymethylolphenols formed in the reaction of the phenol and formaldehyde was converted to the trimethylsilyl derivatives with trimethylchlorosilane, the respective silyl derivatives were separated by fractionation and each fraction then hydrolyzed. From one fraction Martin was able to isolate crystalline trimethylolphenol in an unspecified yield having a melting point of 84° C. after a recrystallization from ethyl acetate. This material is believed to be nearly pure trimethylolphenol. Freeman, J. Am. Chem. Soc., 74, 6257 (1952), was likewise able to secure trimethylolphenol by the neutralization of sodium trimethylolphenate with acetic acid in a dilute suspension in acetone. In this process, Freeman reported a yield of trimethylolphenol of 71 percent but of an obviously impure product (M.P. 74–75° C.), which he found impossible to further purify. In addition, Freeman notes that in his process the trimethylolphenol was not always recoverable in crystalline form, but was quite often secured only as a viscous oily product. The oily product secured by Freeman undoubtedly contains some mono- and dimethylolphenols and dinuclear products which may be caused by the presence of acetic acid and sodium acetate, since Martin, J. Am. Chem. Soc., 73, 3954 (1951), showed that the sodium trimethylolphenate in the presence of acetic acid is not stable and will lose formaldehyde. An undesirable buffering action also exists with the use of acetic acid in this process which prevents the recovery of nearly pure trimethylolphenol in high yields. Acetic acid and sodium acetate form a buffer so that the neutral end point is difficult to detect.

It is obvious that all of these processes are either entirely too cumbersome and expensive for preparing trimethylolphenol suitable for commercial use or too inefficient in securing pure material to justify commercial exploitation.

It is therefore an object of the present invention to provide a process for the direct production of crystalline trimethylolphenol in high yields and excellent purity in an inexpensive and simplified process.

According to the present invention, I have now found a process whereby crystalline trimethylolphenol can be secured in high yields and purity from an alkali or alkaline earth metal salt of trimethylolphenol. Basically this process includes the steps of forming a mixture of the alkali or alkaline earth metal salt of trimethylolphenol with an organic solvent, and neutralizing the said mixture with an acidic material which forms a neutral and substantially insoluble salt with the cation of the alkali or alkaline earth metal salt of trimethylolphenol, removing the said insoluble salt thus formed and recovering the trimethylolphenol from the solvent.

Careful control over the reaction and reaction conditions must be maintained in order to successfully operate this process to secure the high yield and purity of trimethylolphenol.

This process is applicable to the use of any of the alkaline metal salts of 2,4,6-trimethylolphenol, i.e., the alkali or alkaline earth metal salts of trimethylolphenol. I particularly prefer the use of the calcium trimethylolphenate for reasons hereinafter discussed, but other salts such as the sodium trimethylolphenate and the barium trimethylolphenate can also give highly desirable results in this process. These can be prepared in a manner as described in U.S. Patent 2,579,329 issued December 18, 1951, to R. W. Martin. It is highly desirable that the alkaline metal salt of trimethylolphenol employed in this invention be substantially free of mono- and di-methylol products and from di- and polynuclear phenols. The absence of such compounds makes it possible to obtain crystals of substantially pure trimethylolphenol melting at 84–86° C.

In the first step of this process, the alkali or alkaline earth metal salt of trimethylolphenol is admixed with an organic solvent inert to both reactants and products and in which the trimethylolphenol is substantially completely soluble. It is not critical, however, that the trimethylolphenol salt be soluble in the organic solvent for either solutions of the salt or suspensions can be used as desired. I have found, however, that trimethylolphenol salt solutions are preferable in that the salt is immediately available for reaction and that less time is consumed in the reaction and a better purity product is also achieved. As a result it is preferred that the trimethylolphenol salt be at least partially soluble in the solvent selected. Preferred solvents are the lower alkyl alcohols such as methanol, ethanol, isopropanol, and the like, in which all the trimethylolphenol salts are soluble to some degree. Other solvents such as the lower aliphatic ketones, esters, and other polar solvents can also be used if desired, although the trimethylolphenol salts are less soluble in these than in the alcohols.

It is highly desirable in this process that the mixture of the trimethylolphenol salt and solvent be as highly concentrated with salt as possible. If the solvent is present in amounts of greater than about five ml. per gram of salt, the recovery of trimethylolphenol becomes troublesome and time consuming. I particularly prefer the use of solvent in amounts of between about ¾ to 3 ml. per gram of salt, although even less can be used if there is a sufficient amount to facilitate the reaction and take up in solution all of the trimethylolphenol formed.

During the neutralization of this mixture, usually to a pH of about 5 to 7, the temperature of the mixture preferably should not be permitted to exceed about 65° C. At temperatures much above this, the trimethylolphenol and/or the salts tend to enter into undesirable side reactions. I particularly prefer to keep the temperature between about 15° and 45° C., although lower temperatures can be used if desired.

It is highly critical in the operation of this process that the neutralization be carried out with an acid which forms a neutral and substantially insoluble salt with the cation of the trimethylolphenol salt. The term "neutral and substantially insoluble" salt as used herein denotes a salt which is substantially neutral and so little soluble in the selected neutralization medium as to precipitate substantially completely therefrom, or a salt which is so insoluble and so little ionized in said medium as to have no significant effect on the pH of the overall reaction mixture. It is this feature of insolubility and neutrality that makes it possible for the crystalline trimethylolphenol to be recovered free of inorganic salts and any mono- and di-methylolphenol compounds and of di- and polynuclear phenols such as are formed by acid or base catalyzed side reactions. If the neutralizing acidic material forms a substantially acidic or alkaline by-product salt having an appreciable solubility in the neutralization medium, such a salt will promote undesirable side reactions and polymeric material formation and pure trimethylolphenol cannot be recovered. Also, it is difficult to remove the dissolved portion of said salt from the trimethylolphenol and the product will be contaminated and impure. The acidic neutralizing agents must therefore be judiciously selected so as to form a salt which is neutral and substantially insoluble in the organic solvent selected. It is for this reason, among others, that I prefer the use of the calcium trimethylolphenate. This salt is readily prepared in the anhydrous crystalline form and can be neutralized with acids such as carbonic acid, sulfuric acid, oxalic acid, and the like, the calcium salts of which are neutral and substantially insoluble in most organic solvents. Likewise when water is present, acid anhydrides such as carbon dioxide, sulfur trioxide, and the like can be used. The barium trimethylolphenate acts in about the same manner and the same acids can be employed for the neutralization step.

Sodium trimethylolphenate presents a somewhat different problem because of the high degree of solubility of most sodium salts in even trace amounts of water and because so many of these by-product salts are not neutral. In addition, sodium trimethylolphenate itself generally is isolated as the monohydrated crystalline form, yielding one mole of water per mole of sodium trimethylolphenate, this water being difficult to remove. Thus when employing this salt, the most desirable fluid acids which form the necessary neutral and substantially insoluble salts are acids such as HCl and $H_2SO_4$ (and its anhydride, $SO_3$). However other acids forming neutral and substantially insoluble sodium salts can be used.

While the neutralization reaction need not necessarily be conducted under anhydrous conditions, the absence of water during the reaction facilitates high yields and good purities of the trimethylolphenol. I have found that up to about one mole of excess water per equivalent of trimethylolphenate ion can be tolerated but excess water much greater than this amount prevents crystallization of the trimethylolphenol and cannot be tolerated. The term "excess water" denotes water over and above the amount required by the stoichiometry of the neutralization reaction. For instance, if an acid such as HCl is used as the neutralizing agent, no water is required; and any water present in either the organic solvent or the trimethylol salt is "excess water" and can be tolerated only in such limited amounts. Alternatively, if the neutralizing agent is added in the form of an acid anhydride such as $CO_2$, then an equimolar quantity of water is required to form the corresponding acid; and in such cases, the water over and above said required quantity would be "excess water." Trimethylolphenol appears to retain moisture tenaciously; and my experience has shown that when the trimethylolphenol-forming reaction mixture contains a concentration of excess water greater than about 1 mole per mole trimethylolphenate ion, the reaction product is an oily-appearing liquid which resists crystallization—even after it has been subjected to strongly desiccative treatment. Therefore control over the water content of reactants and solvents should be maintained.

With the calcium and barium trimethylolphenate salts, which exist in the anhydrous crystalline state, it is possible to use solvents containing up to one mole of water per trimethylolphenol equivalent, or to use a solvent containing even more water with an acid anhydride neutralizing agent which reacts with said additional water to form the corresponding acid.

However, again the sodium salt of trimethylolphenol presents difficulties in that it has been found to exist as the monohydrated crystals and thus one mole of water is present in the salt-solvent mixture. In this case it is necessary to use substantially anhydrous solvents and acids.

It is also frequently advantageous, in this regard, to conduct the neutralization with an acid anhydride so as to take up an equivalent quantity of water from the reaction mixture. These acid anhydrides, such as carbon dioxide and sulfur trioxide, are desirable in many cases, and particularly carbon dioxide when used to neutralize calcium or barium trimethylolphenate. It not only serves to consume water and thereby to reduce the excess water content, but also with this agent, i.e., $CO_2$, it is virtually impossible to overacidify the reaction mixture, thereby avoiding any possibility of causing polymerization or side reactions. The calcium or barium carbonate is neutral and insoluble in most solvents, including water. Thus, no problems are created by its presence even when some water is present in the mixture being neutralized.

The neutralization reaction, while critical in the abovementioned features, can readily be conducted by following the pH of the reaction mixture with an indicator such as bromphenol blue or methyl orange or with a pH meter. It is also possible to pre-determine the amount of acid needed to reach the neutral end point by gravimetric or volumetric means. With strongly acidic agents such as HCl, $SO_3$ $H_2SO_4$, etc., it is desirable to add the soluble neutralizing acid or acid material slowly so as to avoid localized over-acidity. Generally, no such precaution need be taken with the cation exchange resins or with weakly acidic soluble agents such as $CO_2$. Where the neutral end point is overshot, it is possible in this process to reduce excess acidity with a suitable acid acceptor, such as $K_2CO_3$ or the like, but more preferably it can be accomplished by adding a corresponding additional amount of alkali or alkaline earth metal salt of trimethylolphenol.

A particularly desirable embodiment of this invention resides in the use of an insoluble, solid acid as the neutralizing agent for all of the trimethylolphenol salts. An insoluble, solid acid, i.e., a cation exchange resin, can be advantageously employed with all of the alkali and alkaline earth metal salts to secure the trimethylolphenol in high yield and purity without dangere of acid catalyzed side reactions or polymerization. Particularly desirable of the cation resins which can be used are the polysulfonated cationic exchange resins and the polycarboxylic cationic exchange resins, for instance the polystyrene acid resins, such as the polystyrene sulfonic acid and polystyrene carboxylic acid resins as the Rohm and Haas Co. "Amberlite IR–120" resin and the "Amberlite IRC–50." However other cation exchange resins having similar ion exchanging properties can also be employed.

Neutralization with such solid acids follows the same course as with the soluble acids, i.e., the by-products salt formed is neutral and substantially insoluble. Thus a solution or suspension or the trimethylolphenate salt in the organic solvent is contacted with the ion exchange resin. The trimethylolphenol released is immediately picked up by the solvent and after removal of the exchange resin, the trimethylolphenol is recovered from the solvent. A frequently convenient technique is to continuously pass a solvent solution of the trtimethylolphenol salt through a packed column thereby combining the neutralization and by-product salt separation simultaneously. Very high yields and purity of the trimethylolphenol are secured by this method. It also has the distinct advantage of being able to handle any salt of trimethylolphenol with relatively little danger of over acidifying the mixture or forming other than a neutral and substantially insoluble by-product salt.

During neutralization of the trtimethylolphenol salt, the trtimethylolphenol remains dissolved in the solvent and the neutral and substantially insoluble by-product salt precipitates from the solution. After the neutralization is completed, the precipitated by-product salt can then be removed from the solvent solution by filtration, centrifugation, decantation, or other suitable means and the solvent solution concentrated by distilling off the solvent under reduced pressure and at temperatures preferbly not exceeding about 50° C. Increased yields are secured if the salts after removal from the solvent solution are washed with portions of fresh solvent or with another suitable solvent for trtimethylolphenol but a nonsolvent for the salt. By taking the solvent-trimethylolphenol solution to dryness by solvent evaporation, the trimethylolphenol crystallizes. It can then be ground to a uniform size and stored under moisture-proof conditions. As an alternative method for recovery, the trimethylolphenol can be precipitated from the solvent solution by the addition of appropriate amounts of a solovent-miscible liquid in which the trimethylolphenol is not soluble. Some suitable organic compounds for causing the crystallization of trimetholoplphenol from solvent solutions in this manner include benzene, chloroform, methyl ethyl ketone, and $CCl_4$. If desired, further purification of the trimethylolphenol can be secured by recrystallizing the product from an anhydrous solvent such as ethyl acetate. Again, water in amounts greater than one mole per mole of trimethylolphenol in the recrystallization solvents must not be present during the recrystallization step.

In most cases, however, recrystallizing the trimethylolphenol is not necessary as the product can be recovered having a sharp melting point at 84° to 86° C. Melting points in this range signify a pure or nearly pure product. Yields of 75 percent of theoretical or better are possible by this process, and quite often yields of better than 90 percent have been secured where care was exercised in the process in maintaining nearly anhydrous conditions.

The following examples are illustrative of this invention.

*Example I*

A 3-liter, 3-neck, round-bottomed flask equipped with an agitator, drying tube, thermometer and gas-inlet tube was charged with 206 g. of dried sodium trimethylolphenate, 150 ml. of anhydrous methanol (prepared by distillation from magnesium) and 3 drops of 0.5% bromphenol blue indicator and placed in an ice bath. The mixture was agitated vigorously until the temperature of the suspension was below 20° C. Anhydrous hydrogen chloride, dried by passage through concentrated sulfuric acid, was then admitted as rapidly as possible without having the reaction mixture's temperature exceed 25° C. at any time. Within ½ hour the solution suddenly became yellow, indicating an acid medium. The HCl flow was discontinued and the reaction mixture was immediately neutralized with anhydrous potassium carbonate. The sodium and potassium chlorides were removed by filtration and the methanolic filtrate was concentrated in vacuo (pressure about 120 mm.) at room temperature until it attained a viscous, oil-like consistency. About 100 ml. of acetone which had been dried over anhydrous calcium sulfate was added and the rather viscous, turbid mixture was refrigerated overnight. The large crop of fine white crystals which settled out was isolated. The mother liquor was concentrated in vacuo, about 40 ml. of dry ethyl acetate added, the mixture refrigerated, and the crystalline material which settled out was isolated and combined with the first crop. There was so obtained 170 g. (92.4% of theory) of a fine white crystalline product which had a melting point of 84–85° C. and a methylol (i.e., —$CH_2OH$) content of 49.6%. (Calculated for trimethylolphenol: 50.5%.)

The methylol content is determined by reacting a sample with excess m-cresol containing 1–2% p-toluenesulfonic acid as catalyst in a sealed ampoule for 16 hrs. at 105° C., then measuring, by Karl Fischer Titration, the moisture evolved during the reaction.

$$\text{Percent methylol} = \frac{\text{wt. } H_2O \text{ evolved}}{\text{sample wt.}} \times \frac{31}{18} \times 100$$

The method is, in essence, a modified version of that described by Martin, Anal. Chem., 23, 883 (1951).

*Example II*

A 12-liter, 3-necked, round-bottomed flask equipped as in Example I was charged with 2200 g. (10 moles) of partially hydrous sodium trimethylolphenate containing 140 g. moisture as determined by Karl Fischer Titration, and 4400 ml. of 99% isopropanol and placed in an ice-salt bath. (Total moisture content of suspension was therefore 184 g. or 1.02 moles water per mole trimethylolphenate.) When the vigorously agitated suspension had been cooled to 10–15° C., anhydrous HCl (dried by passage through conc. $H_2SO_4$) was bubbled in at such a rate that the reaction mass temperature did not exceed 25° C., until neutralization was completed, as signalled by the reaction mixture's changing color from tan to white. (The pH of the reaction mixture at this point was about 5.) The reaction mixture was then filtered, the sodium chloride cake washed with dry isopropanol and said washings added to the filtrate which was then concentrated in vacuo (pressure about 5 mm.) at room temperature overnight. The solids that separated out were collected on a Buchner funnel and the liquor expressed therefrom by means of a rubber membrane over the crystal pack. The crystals then were vacuum desiccated at room temperature over sodium hydroxide pellets and paraffin. The 1020 g. (55% of theory) of light grey solids so obtained had a melting point of 75–85° C. The mother liquors upon successive concentrations, filtrations, etc. as above, yielded an additional 480 g. of product. The total mixture (1500 g. corresponding to 81% of theory) was thoroughly mixed and pulverized. It had a melting point range of 65–84° C. Recrystallization by dissolution in methanol, followed by acetone addition, vacuum concentration, etc. as above yielded a fine, white crystalline product melting at 84–85° C.

Example III

A mixture consisting of 188 g. (2 moles) of phenol, 324 g. (4 moles) of 37% aqueous formalin and 90 g. (3 moles) of paraformaldehyde was cooled in an ice bath to 15° C. and 56 g. (1 mole) of reagent grade lime, taken from a newly opened bottle, was added to the mixture with vigorous agitation at such a rate that the reaction mass temperature remained below 35° C. throughout. After 2 hrs. of agitation, 200 ml. of water was added, the ice bath was removed and agitation was continued for an additional 14 hrs. during which period the reaction temperature remained at 25–30° C. without external cooling. The reaction mixture was poured slowly into 2.5 liters of a vigorously agitated 2:1 (by volume) acetone-isopropanol solution. The white precipitate which formed was allowed to settle for 2 hours, then collected on a Buchner funnel and the solvents completely expressed therefrom by means of a rubber dam. The filter cake was desiccated for several hour in a vacuum desiccator over sodium hydroxide pellets and paraffin at room temperature, then comminuted. There was so obtained 362 g. (89% yield) of a fine, a white powder which was readily soluble in water, less soluble in methanol and ethanol, slightly soluble in isopropanol and insolube in acetone. It had a neutralization equivalent of 204 (average of 4 determinations) as determined by titration with hydrochloric acid to a bromphenol blue endpoint. (Calculated for calcium trimethylolphenate: 203.)

Example IV

A 1-liter, 3-necked, round bottomed flask outfitted with an agitator, drying tube, thermometer and gas inlet tube was charged with 102 g. (0.25 mole) of calcium trimethylolphenate (the product of Example III), 4.5 g. (0.25 mole) of water and 300 ml. of anhydrous methanol. $CO_2$ was then bubbled into the viborously agitated suspension for about 3 hours. The pH was 7. Further addition of $CO_2$ did not effect any further change in pH. About 150 ml. of dry acetone was then added, with agitation, to the viscous mixture, and the voluminous precipitate of $CaCO_3$ which settled on standing was removed by filtration and washed several times with dry acetone. The combined washings and filtrate was vacuum concentrated (at about 5 mm. pressure at room temperature) to a thick yellow syrup which changed, on refrigeration, to a crystalline mass. The entire mass was washed with cold (−5° C.) dry acetone and desiccated. The crystalline product had a melting point of 65–70° C. at this point. It was re-dissolved in the minimum amount of dry methanol, the methanol solution diluted with an approximately equal volume of dry acetone and vacuum concentrated (at 5 mm.) at room temperature with occasional additions of small portions of dry acetone as needed until all the methanol was removed. The trimethylolphenol was precipitated out of this acetone mixture by adding thereto a dry 1:1 (by vol.) mixture of $CCl_4$-acetone, collected by filtration and dried. The white crystalline product so obtained melted sharply at 82–83° C. and was identified as trimethylolphenol.

Example V

Seventeen grams of a cation exchange resin (Amberlite IRC–50, Rohm and Haas Co.), which had previously been thoroughly washed with methanol and dried, was added to a mixture consisting of 10 g. of dry calcium trimethylolphenate having a neutralization equivalent of 204 and 40 ml. dry methanol. The mixture was agitated at 30° C. until it attained a pH of 6.5–7.0 (35–40 minutes) then filtered. The exchange resin was washed with two 10 ml. portions of dry methanol, the methanolic filtrates combined and concentrated in vacuo to a total volume of about 15 ml. A mixture consisting of 25 ml. dry acetone and 25 ml. dry carbon tetrachloride was added, the resultant slurry concentrated in vacuo to an overall volume of about 20 ml. and an additional 25 ml. of the 1:1 dry acetone-dry $CCl_4$ mixture added. The mixture was refrigerated overnight, then filtered and the solids vacuum dried at room temperature. There was so obtained 4 g. of a white, crystalline product which melted sharply at 80–81° C., and was identified as crystalline trimethylolphenol by taking a mixed melting point with an authentic sample.

I claim:

1. A process for the preparation of crystalline 2,4,6-trimethylolphenol which includes the steps of forming a mixture of a metal salt of 2,4,6-trimethylolphenol selected from the group consisting of the alkali metal and alkaline earth metal salts of 2,4,6-trimethylolphenol in an inert organic solvent for 2,4,6-trimethylolphenol, neutralizing the said mixture with an acidic material forming a neutral and substantially insoluble salt with the cation of the metal salt in the neutralized mixture at a temperature below about 65° C., under such conditions that the water content of the neutralized mixture is no greater than about one mole per mole of 2,4,6-trimethylolphenol formed, removing said neutral and substantially insoluble salt from the mixture, and recovering crystalline 2,4,6-trimethylolphenol from the said organic solvent.

2. A process for the preparation of crystalline 2,4,6-trimethylolphenol which includes the steps of neutralizing a mixture of a metal salt of trimethylolphenol selected from the group consisting of the alkali metal and alkaline earth metal salts of 2,4,6-trimethylolphenol and an inert solvent present in amounts at least sufficient to dissolve substantially all of the 2,4,6-trimethylolphenol liberated, the neutralizing being done with an acidic material forming a neutral and substantially insoluble salt with the cation of the metal salt of trimethylolphenol and at a temperature below about 65° C. under such conditions that the water content of the neutralized mixture is no greater than about one mole per mole of 2,4,6-trimethylolphenol formed, removing the salt thus formed and recovering the 2,4,6-trimethylolphenol from the solvent solution.

3. A process for the preparation of crystalline 2,4,6-trimethylolphenol which includes the steps of forming a mixture of a metal salt of 2,4,6-trimethylolphenol selected from the group consisting of the alkali metal and alkaline earth metal salts of 2,4,6-trimethylolphenol with an inert organic solvent for 2,4,6-trimethylolphenol, neutralizing the mixture at a temperature below about 65° C. to a pH between 5 and 7 with an acidic material forming a neutral and substantially insoluble salt with the cation of the metal salt of 2,4,6-trimethylolphenol in the mixture under the conditions such that the water content in the neutralized mixture is no greater than about one mole per mole of trimethylolphenol, removing the neutral and insoluble salt formed and recovering the 2,4,6-trimethylolphenol from the organic solvent.

4. A process according to claim 3 wherein the acidic material is a solid cationic exchange resin.

5. A process according to claim 3 wherein the metal salt of 2,4,6-trimethylolphenol is sodium 2,4,6-trimethylolphenate and the said organic solvent and said neutralizing acid are substantially anhydrous.

6. A process according to claim 3 wherein the metal salt of 2,4,6-trimethylolphenol is barium 2,4,6-trimethylolphenate.

7. A process according to claim 3 wherein the metal salt of 2,4,6-trimethylolphenol is calcium 2,4,6-trimethylolphenate.

8. A process according to claim 7 wherein the acidic material is carbonic acid.

9. A process for the preparation of crystalline 2,4,6-trimethylolphenol which includes the steps of forming a mixture of calcium 2,4,6-trimethylolphenate in an inert organic solvent for 2,4,6-trimethylolphenol and water present in amounts of no greater than about two moles per equivalent of 2,4,6-trimethylolphenate ion, contacting said mixture with carbon dioxide at a temperature less than about 65° C., until the pH of the mixture is between 5 and 7, removing the calcium carbonate formed and crystallizing the 2,4,6-trimethylolphenol from the solvent solution.

10. A process for the preparation of crystalline 2,4,6-trimethylolphenol which includes the steps of contacting a mixture of a metal salt of 2,4,6-trimethylolphenol selected from the group consisting of the alkali metal and alkaline earth metal salts of 2,4,6-trimethylolphenol in an inert organic solvent for 2,4,6-trimethylolphenol with a solid cation exchange resin in amounts sufficient to adjust the pH of the mixture to between 5 and 7 while maintaining the mixture at a temperature less than about 65° C. under conditions such that the water content of the neutralized mixture is no greater than about one mole per mole of 2,4,6-trimethylolphenol, removing the cation exchange resin from the solvent mixture and crystallizing the 2,4,6-trimethylolphenol from the solvent.

11. The process according to claim 10 wherein the metal salt of 2,4,6-trimethylolphenol is sodium 2,4,6-trimethylolphenate.

12. The process according to claim 10 wherein the metal salt of 2,4,6-trimethylolphenol is barium 2,4,6-trimethylolphenate.

13. The process according to claim 10 wherein the metal salt of 2,4,6-trimethylolphenol is calcium 2,4,6-trimethylolphenate.

References Cited in the file of this patent

Freeman et al.: Jour. Amer. Chem. Soc., vol. 74 (1952), pages 6257–60 (4 pgs.).